(12) United States Patent
Hrovat et al.

(10) Patent No.: US 8,108,104 B2
(45) Date of Patent: Jan. 31, 2012

(54) TRIPPED ROLLOVER MITIGATION AND PREVENTION SYSTEMS AND METHODS

(75) Inventors: Davor Hrovat, Ann Arbor, MI (US); Eric Tseng, Canton, MI (US); Michael Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1141 days.

(21) Appl. No.: 11/560,483

(22) Filed: Nov. 16, 2006

(65) Prior Publication Data

US 2008/0119984 A1 May 22, 2008

(51) Int. Cl.
*B60G 17/016* (2006.01)
(52) U.S. Cl. ............ 701/38; 180/21; 180/209; 180/282; 280/5.506; 280/5.509; 280/755; 280/767; 701/36; 701/37; 701/41; 701/48
(58) Field of Classification Search ............ 701/38, 701/37, 36, 1, 41, 48; 180/21, 208, 282; 280/5.506, 5.509, 755, 767
See application file for complete search history.

(56) References Cited

U.S. PATENT DOCUMENTS

| | | | |
|---|---|---|---|
| 2,398,541 A | 4/1946 | Leach | 180/209 |
| 3,625,303 A * | 12/1971 | Cameron | 180/169 |
| 3,700,059 A | 10/1972 | Sutton | 180/209 |
| 3,826,322 A | 7/1974 | Williams | 180/202 |
| 4,595,072 A * | 6/1986 | Barnea | 180/169 |
| 4,605,086 A | 8/1986 | Marom | 180/202 |
| 4,691,798 A * | 9/1987 | Engelbach | 180/209 |
| 5,383,680 A | 1/1995 | Bock et al. | |
| 5,450,322 A | 9/1995 | Tanaka et al. | |
| 5,497,325 A | 3/1996 | Mine | |
| 5,684,698 A * | 11/1997 | Fujii et al. | 701/38 |
| 6,161,844 A | 12/2000 | Charaudeau et al. | |
| 6,290,019 B1 | 9/2001 | Kolassa et al. | |
| 6,394,738 B1 | 5/2002 | Springer | 414/673 |
| 6,439,582 B1 | 8/2002 | Burdock | |
| 2003/0088349 A1 | 5/2003 | Schubert et al. | 701/36 |
| 2003/0090097 A1* | 5/2003 | Ranc | 280/767 |
| 2004/0041358 A1 | 3/2004 | Hrovat et al. | |
| 2005/0006166 A1 | 1/2005 | Cho | |
| 2005/0110227 A1 | 5/2005 | Stefan et al. | |
| 2005/0206124 A1* | 9/2005 | Levi et al. | 280/304.1 |
| 2005/0207876 A1* | 9/2005 | Springwater | 414/231 |
| 2005/0216154 A1* | 9/2005 | Lehmann et al. | 701/38 |

OTHER PUBLICATIONS

Jon Clemens, Soldiers Try Out Medium Armor in Fort Knox Demonstrations, Mar.-Apr. 2000, ARMOR Magizine, pp. 30-32.*

* cited by examiner

*Primary Examiner* — Khoi Tran
*Assistant Examiner* — Stephen Holwerda
(74) *Attorney, Agent, or Firm* — O'Brien Jones PLLC (57) ABSTRACT

A rollover stability control system for a vehicle may include an object information device. An active suspension or an active steering system may be coupled to a wheel of the vehicle. The rollover system may include a lateral support system. A controller determines that an obstacle is an imminent tripping obstacle and raises or steers the wheel, to prevent the wheel from colliding with the obstacle, or deploys the lateral support system in response to a rollover notification signal and the determination. A rollover stability control system for a vehicle may include a chassis and a driving surface wheel. A wheel assembly is coupled to the chassis inward from the driving surface wheel relative to a longitudinal centerline of the vehicle. The wheel assembly contacts the driving surface when a roll angle of the vehicle is greater than a predetermined level.

23 Claims, 6 Drawing Sheets

TRIPPED ROLLOVER MITIGATION AND PREVENTION SYSTEMS AND METHODS

TECHNICAL FIELD

The present invention relates generally to vehicle control systems, vehicle sensing systems, rollover prevention systems, and stability control systems. More particularly, the present invention is related to techniques for mitigating and preventing rollovers in association with imminent tripping obstacles.

BACKGROUND

Several stability control systems currently exist. Examples of stability control systems are electronic stability control systems (ESC), yaw stability control systems (YSC), and roll stability control systems (RSC). The stability control systems are utilized to maintain controlled and stable vehicle operations for improved vehicle and occupant safety. The stability control systems are often used to maintain vehicle tractions and to prevent or mitigate a roll over event.

Roll stability control systems are utilized to prevent a vehicle from rolling. Rolling or rollovers often occur when a vehicle has departed a roadway, and attempts to re-enter the roadway. One common obstacle that causes such a tripped event is a roadside curb.

Although there currently exist stability control systems for ride comfort and road handling, and for mitigating and preventing untripped rollover events, such systems are incapable and/or limited in their ability to mitigate and prevent tripped rollover events.

Thus, there exists a need for an improved stability control system, which accounts for imminent tripping obstacles and overcomes the limitations of current stability control systems.

SUMMARY OF THE INVENTION

One embodiment of the present invention provides a rollover stability control system for a vehicle that includes an object information device which detects an obstacle. An active suspension is coupled to the wheel of the vehicle. A controller is coupled to the object information device and the active suspension. When the controller determines the obstacle to be an imminent tripping obstacle, it raises the wheel to prevent the wheel from colliding with the obstacle in response to a rollover notification signal and the determination.

Another embodiment of the present invention provides a rollover stability control system for a vehicle that includes an object information device which detects an obstacle. An active steering system is coupled to a wheel of the vehicle. A controller is coupled to the object information device and the active steering system. When the controller determines the obstacle to be an imminent tripping obstacle it steers the wheel toward the obstacle in response to a rollover notification signal and the determination.

Yet another embodiment of the present invention provides a rollover stability control system for a vehicle. The stability control system includes an object information device which detects an obstacle and a lateral support system. A controller is coupled to the object information device and the deployable system. When the controller determines the obstacle to be an imminent tripping obstacle it deploys the lateral support system externally and outwardly from the vehicle in response to a rollover notification signal and the determination.

Still another embodiment of the present invention provides a rollover stability control system for a vehicle that includes a chassis. A driving surface wheel is coupled to the chassis and is in contact with a driving surface. A wheel assembly is coupled to the chassis inward from the driving surface wheel and relative to a longitudinal centerline of the vehicle. The wheel assembly contacts the driving surface when a roll angle of the vehicle is greater than a predetermined level.

The embodiments of the present invention provide several advantages. One advantage provided by an embodiment of the present invention is the ability to delay or avoid colliding with an imminent tripping obstacle.

Additionally, another advantage provided by an embodiment of the present invention is the ability to delay a collision with an imminent tripping obstacle through the use of wheels or wheel sets that are mounted inward of normal drive surface wheels of a vehicle. The inwardly mounted wheels sets unload the drive surface wheels.

In delaying the contact with or the collision with an imminent tripping obstacle, the potential pivot point of the vehicle is shifted, relative to a centerline of the vehicle. Shifting the pivot point inward or away from the leading side of the vehicle increases the forces needed to cause a rollover.

Another advantage provided by an embodiment of the present invention is the ability to laterally stabilize a vehicle in response to the detection of an imminent tripping obstacle and/or as a result of coming in contact with, riding over, or colliding with the obstacle.

A further advantage provided by another embodiment of the present invention is the ability to ride over an imminent tripping obstacle.

The above-stated advantages alone and in combination mitigate and/or prevent a vehicle rollover.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

In the following figures, the same reference numerals will be used to identify the same components. The present invention may be used in conjunction with vehicle control systems including a yaw stability control (YSC) system, roll stability control (RSC) system, lateral stability control (LSC) system, integrated stability control (ISC) system, or a total vehicle control system for achieving fuel economy and safety and other vehicle level performances. The present invention is also described with respect to an integrated sensing system (ISS), which uses a centralized motion sensor cluster such as an inertial measurement unit (IMU) and other available, but decentralized, sensors. Although a centralized motion sensor, such as an IMU, is primarily described, the techniques described herein are easily transferable to using the other discrete sensors.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Figure 1:
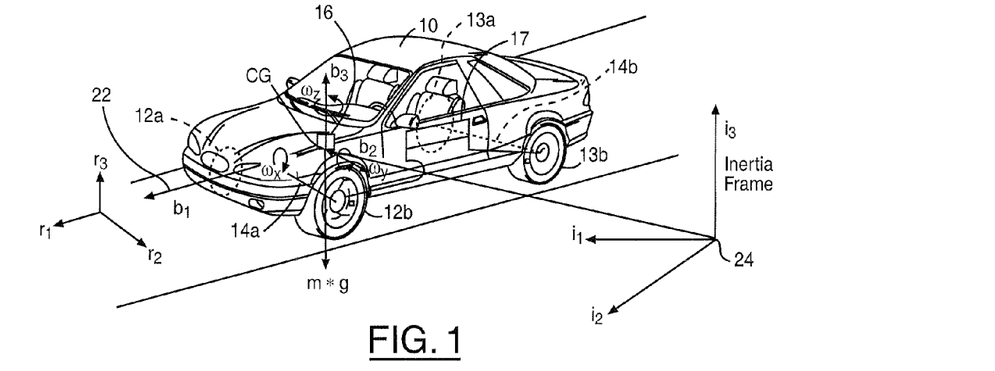
FIG. 1 is a block diagrammatic and perspective view of a vehicle with variable vectors and coordinate frames in accordance with an embodiment of the present invention.

Referring to FIG. 1, an automotive vehicle 10 with a safety control system 11 of the present invention is illustrated with the various forces and moments thereon during a rollover condition or a post collision event. Vehicle 10 has front right ($FR_w$) and front left ($FL_w$) wheel/tires 12a and 12b and rear right ($RR_w$) wheel/tires 13a and rear left ($RL_w$) wheel/tires 13b, respectively. The vehicle 10 may also have a number of different types of front steering systems 14a and rear steering systems 14b, including having each of the front and rear wheels 12a and 12b configured with a respective controllable actuator, the front and rear wheels 12a and 12b having a conventional type system in which both of the front wheels 12a are controlled together and both of the rear wheels 12b are controlled together, a system having conventional front steering and independently controllable rear steering for each of the wheels 12a and 12b, or vice versa. Generally, the vehicle 10 has a weight represented as Mg at the center of gravity of the vehicle 10, where g=9.8 m/S² and M is the total mass of the vehicle 10.

The control system 11 has tripped rollover mitigation and prevention systems, which include and/or comprise of active/semi-active suspension systems, an active steering system, a deployable lateral stability system, inwardly mounted wheel assemblies, and other related devices. Such systems, assemblies, and devices are described in detail below. The control system 11 may also be used with or include an anti-roll bar, or airbags or other safety devices deployed or activated upon sensing predetermined dynamic conditions of the vehicle 10.

The control system 11 includes a sensing system 16 that is coupled to a control system 18. The sensing system 16 may have many different active and passive sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor and a longitudinal accelerometer. The sensing system 16 also includes object detection sensors, which aid in the detection of an imminent rollover obstacle. An "imminent rollover obstacle" is an object, such as a curb or other object, having a top surface that is above that of the road surface currently being traveled on. An imminent rollover obstacle is also an object for which there is a high probability of the host vehicle colliding therewith and a high probability that such a collision would cause the vehicle to rollover. When a vehicle is experiencing a large roll angle or high lateral slip angle and comes in contact with an imminent rollover obstacle, a rollover may result. The object creates a pivot point upon which a rollover occurs. The various sensors will be further described below and are shown with respect to FIG. 2.

The sensors may also be used by the control system 11 in various determinations such as to determine a lifting event, determine a height and position of a mass, etc. The wheel speed sensors 20 are mounted at each corner of the vehicle and generate signals corresponding to the rotational speed of each wheel. The rest of the sensors of the sensing system 16 may be mounted directly on the center of gravity of the vehicle body, along the directions x, y, and z shown in FIG. 1. As those skilled in the art will recognize, the frame from $b_1$, $b_2$, and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame or chassis 22 as described below.

The angular rate sensors and the accelerometers may be mounted on the vehicle car body along the body frame directions $b_1$, $b_2$, and $b_3$ which are the x-y-z axes of the sprung mass of the vehicle.

The longitudinal acceleration sensor is mounted on the car body located at the center of gravity, with its sensing direction along $b_1$ axis, whose output is denoted as $a_x$. The lateral acceleration sensor is mounted on the car body located at the center of gravity, with its sensing direction along $b_2$ axis, whose output is denoted as $a_y$.

FIG. 1 depicts a road frame system $r_1 r_2 r_3$ that is fixed on the driven road surface, where the $r_3$ axis is along the average road normal direction computed from the normal directions of the four-tire/road contact patches.

Figure 2:
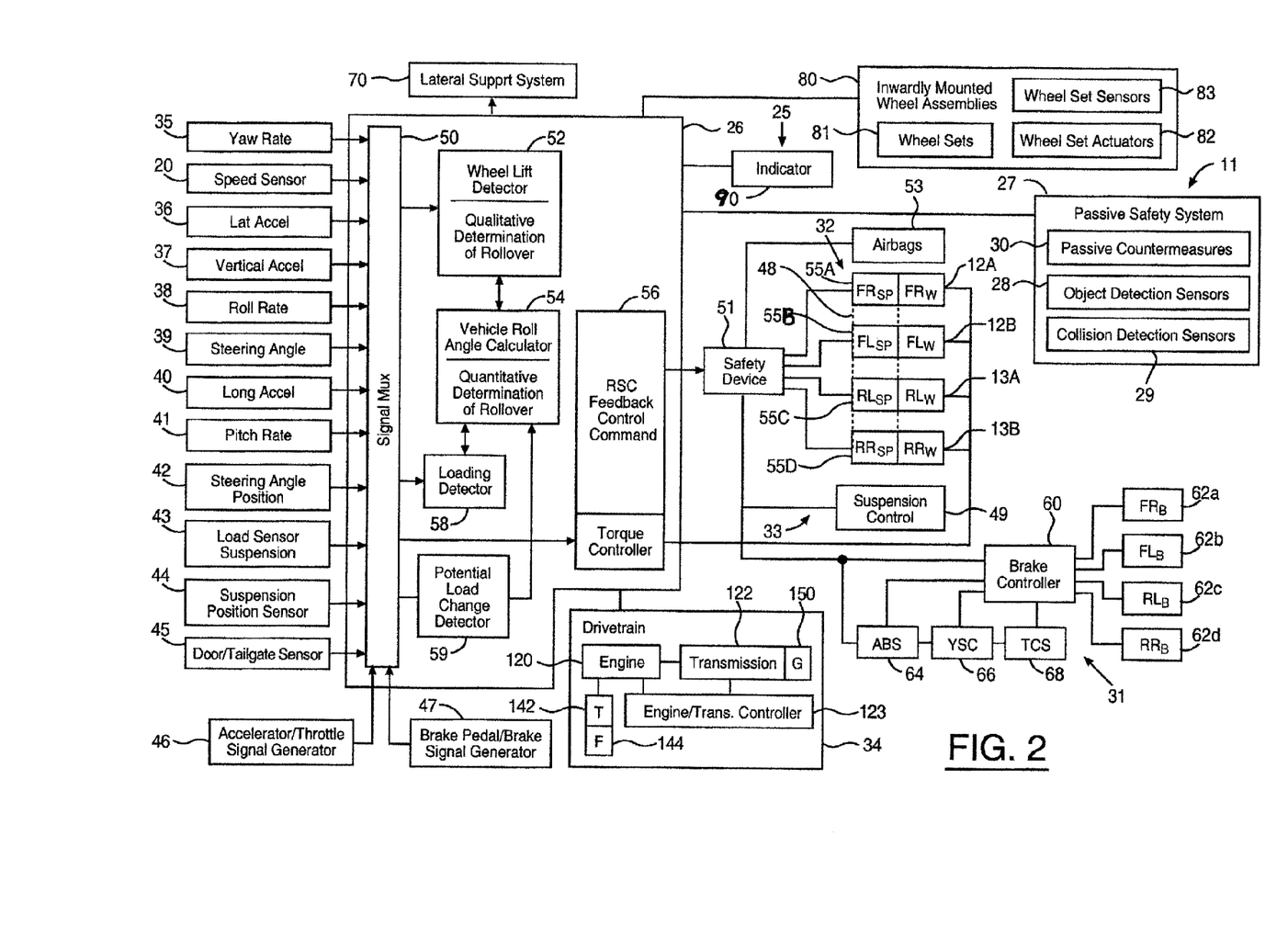
FIG. 2 is a block diagrammatic view of a control system incorporating a stability control system in accordance with an embodiment of the present invention.

Referring now also to FIG. 2, a block diagrammatic view of the control system 11 incorporating a stability control system 25 in accordance with an embodiment of the present invention is shown. The control system 11 has multiple modes of operation including a normal stability control system operating mode and a tripped rollover stability control system operating mode. While in the normal operating mode, the control system 11 performs similarly and utilizes set parameters that are similar to that of traditional stability control systems. However, upon detection of an imminent tripping obstacle and the generation of a rollover notification signal, the control system 11 operates in the tripped rollover operating mode. In the tripped rollover operating mode the control system 11 operates to mitigate and prevent a vehicle rollover due to the imminent tripping obstacle.

The stability control system 25 may be or include a RSC system, an ESC system, an ISC system, a YSC system, a LSC system, or some other stability control system known in the art. Several of the stated control systems are shown and described with respect to FIG. 2 and 3. The control system 11 is illustrated in further detail having a controller 26, a passive safety system 27-30, multiple active systems 31-34, various vehicle status sensors 20 and 35-47, and driver or vehicle operator input sensors 38, 43A, and 43B. The passive system 27 includes object information devices or sensors 28, collision detection sensors 29, and various passive countermeasures 30. The active systems may include a brake control system 31, a steering control system 32, a suspension control system 33, and a drivetrain control system 34. Based upon inputs from the sensors, controller 26 controls operation of the safety device 51.

The controller 26, as well as, the suspension control 49, the brake controller 60, and the engine/transmission controller 123 may be microprocessor based such as a computer having a central processing unit, memory (RAM and/or ROM), and associated input and output buses. The controllers 26, 49, 60, and 123 may be application-specific integrated circuits or may be formed of other logic devices known in the art. The controllers 26, 49, 60, and 123 may each be a portion of a central vehicle main control unit, an interactive vehicle dynamics module, a restraints control module, a main safety controller, a control circuit having a power supply, combined into a single integrated controller, or may be a stand-alone controller as shown. The controllers 26, 49, 60, and 123 may be configured to be mounted and located within a vehicle dashboard or vehicle panel or in some other location on the vehicle 10.

The object detection sensors 28 monitor an environment exterior to the vehicle 10 and generate object detection signals upon detection of an object. The object detection sensors 28 may be infrared, visible, ultrasonic, radar, active electromagnetic wave-ranging, or lidar based, a charged-coupled device, a series of photodiodes, or in some other form known in the art. Wave-ranging devices may include radar, lidar, stereo camera pairs, 3-D imagers, with active infrared illumination, or other wave-ranging devices known in the art. Vision sensors may refer to robotic cameras or other visual imaging cameras. The wave-ranging sensors and the vision sensors may be monocular or binocular and may be used to obtain height, width, depth, range, range rate, angle, and any other visual aspect information. Monocular cameras may be used to obtain less accurate and less reliable range and range rate data as compared to binocular cameras. The object detection sensors 28 may also be in the form of an object indicator, a global positioning system, a navigation system, or a laser sensor. The object detection sensors 28 may be in various locations on the vehicle and any number of each may be utilized. The object detection sensors may also include occupant classification sensors (not shown).

The collision detection sensors 29 are used to detect a collision and more particularly, a light side collision. The collision detection sensors 29 may also be located anywhere on the vehicle 10 and generate collision detection signals in response to a collision. The collision detection sensors 29 may include sensors that are used as vehicle status sensors, such as the yaw rate sensor 35, the lateral acceleration sensor 36, and the longitudinal acceleration sensor 40. The collision detection sensors 29 may also be in the form of an accelerometer, a piezo electric sensor, a piezo resistive sensor, a pressure sensor, a contact sensor, a strain gage, or may be in some other form known in the art.

The passive countermeasures 30 may include internal air bag control, seatbelt control, knee bolster control, head restraint control, load limiting pedal control, load limiting steering control, pretensioner control, external air bag control, pedestrian protection control, and other passive countermeasures known in the art. Air bag control may include control over front, side, curtain, hood, dash, or other type of airbags known in the art. Pedestrian protection may include a deployable vehicle hood, a bumper system, or other pedestrian protective devices.

The brake control system 31 includes the brake controller 60 that is used to actuate front vehicle brakes 62a and 62b and rear vehicle brakes 62c and 62d. The vehicle brakes 62 are associated with the wheels 12 and 13. The brakes 62 may be independently actuatable through the brake controller 60. The brake controller 60 may control the hydraulic system of the vehicle 10. Of course, electrically actuatable brakes may be used in the present invention.

The steering control system 32 may include a number of different types of front and rear steering systems including having each of the front and rear wheels 12 and 13 configured with respective controllable actuators 55A-D. The wheels 12 and 13 may be controlled together or individually. The steering control system 32 may be electric in form, similar to an electric power assisted steering (EPAS) system.

The suspension control system 33 includes the suspension control 49, the suspension 48, and the suspension adjusting elements 55A-55D ($FR_{SP}$, $FL_{SP}$, $RR_{SP}$, $RL_{SP}$) that are associated with each wheel 12, 13. The suspension control 49 and adjusting elements 55A-55D may be used to adjust the suspension 48 to prevent rollover. The adjusting elements 55A-55D may include electrically, mechanically, pneumatically, and/or hydraulically operated actuators, adjustable dampers, or other known adjustment devices, and are described below in the form of actuators.

The drivetrain control system 34 includes an internal combustion engine 120 or other engine known in the art. The engine 120 may have a throttle device 142 coupled thereto, which is actuated by a foot pedal 144. The throttle device 142 may be part of a drive-by-wire system or by a direct mechanical linkage between the pedal 144 and the throttle device 142. The engine controller 123 may be an independent controller or part of the controller 26. The engine controller 123 may be used to reduce or increase the engine power. While a conventional internal combustion engine is calculated, the vehicle 10 could also be powered by a diesel engine or an electric engine or the vehicle could be a hybrid vehicle utilizing two or more types of power systems.

The drivetrain system 34 also includes a transmission 122, which is coupled to the engine 120. The transmission 122 may be an automatic transmission or a manual transmission.

A gear selector 150 is used to select the various gears of the transmission 122. The gear selector 150 may be a shift lever used to select park, reverse, neutral, and drive positions of an automatic transmission.

The vehicle status sensors 20 and 35-47 may include the yaw rate sensor 35, the speed sensor 20, the lateral acceleration sensor 36, the vertical accelerometer sensor 37, the roll angular rate sensor 38, the steering wheel (hand wheel) angle sensor 39, the longitudinal acceleration sensor 40, the pitch rate sensor 41, the steering angle (of the wheels or actuator) position sensor 42, the suspension load sensor 43, the suspension position sensor 44, the door/tailgate sensor 45, the accelerator/throttle signal generator 46, and the brake pedal/brake signal generator 47. It should be noted that various combinations and sub-combinations of the sensors may be used. The steering wheel angle sensor 39, the accelerator/throttle signal generator 46, and the brake pedal/brake signal generator 47 are considered driver input sensors, since they are associated with a pedal, a wheel, or some other driver input device.

Lateral acceleration, roll orientation and speed may be obtained using a global positioning system (GPS). Depending on the desired sensitivity of the system and various other factors, not all the sensors 20 and 35-47 may be used in a commercial embodiment. Safety device 51 may control one or more airbags 53 or a steering actuator 55A-D at one or more of the wheels 12A, 12B, 13A, 13B of the vehicle.

Roll angular rate sensor 38 and pitch rate sensor 41 may sense the roll condition or lifting of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 38 may also use a combination of sensors such as proximity sensors to make a roll rate determination.

Roll rate sensor 38 and pitch rate sensor 41 may also sense the roll condition or lifting based on sensing the linear or rotational relative displacement or displacement velocity of one or more of the suspension chassis components. This may be in addition to or in combination with suspension position sensor 44. The suspension position sensor 44, roll rate sensor 38 and/or the pitch rate sensor 41 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or lifting may also be sensed by sensing directly or estimating the force or torque associated with the loading condition of one or more suspension or chassis components including a pressure transducer in an active air suspension, a shock absorber sensor such as the load sensor 43, a strain gauge, the steering system absolute or relative motor load, the steering system pressure of the hydraulic lines, a tire lateral force sensor or sensors, a longitudinal tire force sensor, a vertical tire force sensor, or a tire sidewall torsion sensor (although all of which are not shown, one skilled in the art would recognize and readily understand the incorporated use thereof). The yaw rate sensor 35, the roll rate sensor 38, the lateral acceleration sensor 36, and the longitudinal acceleration sensor 40 may be used together to determine that the wheel has lifted. Such sensors may be used to determine wheel lift or estimate normal loading associated with wheel lift.

The roll condition of the vehicle may also be established by one or more of the following translational or rotational positions, velocities or accelerations of the vehicle including a roll gyro, the roll rate sensor 38, the yaw rate sensor 35, the lateral acceleration sensor 36, the vertical acceleration sensor 37, a vehicle longitudinal acceleration sensor 40, lateral or vertical speed sensor including the wheel-based speed sensor 20, or other speed sensors, such as a radar-based speed sensor, a sonar-based speed sensor, a laser-based speed sensor, and an optical-based speed sensor.

The controller 26 may include a signal multiplexer 50 that is used to receive the signals from the sensors 20 and 35-47. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. The RSC feedback command 56 may include a torque controller 57.

A loading detector 58 may also be included in controller 26. The loading detector 58 may be used to determine an additional mass of the vehicle and a distance of the mass as will be described below.

A potential load change detector 59 may also be included in controller 59. The potential load change detector 59 may qualitatively determine if there was a potential change in load for the vehicle. If the vehicle has stopped (from speed sensor 20) and a door/tailgate sensor indicates the door was opened, the load may have changed. Further the longitudinal acceleration may be compared to the estimated driveshaft torque. The driveshaft torque may be estimated by the engine or transmission controller 123. Suspension height changes may also indicate the load has changed. This may be obtained using the suspension position sensor 44. The load change may be directly observed at the load sensor 43, if the vehicle is so equipped. Transmission shifting changes depending on the load. Therefore, the transmission controller may output a signal indicating a changed load. The throttle movement from the accelerator pedal or actual throttle itself may be determined at the throttle signal generator 46. The brake signal generator 47 may generate a braking signal. By looking at the trend (more or less force or shorter or longer duration) a load may be determined.

The vehicle dynamic sensors 36-38 and 40-41 may be located at the center of gravity of the vehicle 10. Those skilled in the art will recognize that the sensors may also be located off the center of gravity and translated equivalently thereto.

The speed sensor 20 may be one of a variety of speed sensors known to those skilled in the art. For example, a suitable speed sensor may include a sensor at every wheel that is averaged by controller 26. The controller 26 may translate the wheel speeds into the speed of the vehicle 10. Yaw rate, steering angle, wheel speed and possibly a slip angle estimate at each wheel may be translated back to the speed of the vehicle 10 at the center of gravity. Various other algorithms are known to those skilled in the art. Speed may also be obtained from a transmission sensor (not shown). For example, if speed is determined while speeding up or braking around a corner, the lowest or highest wheel speed may not be used because of its error.

Load sensor 43 may be a load cell coupled to one or more suspension components. By measuring the stress, strain or weight on the load sensor 43 a shifting of the load can be determined.

The roll condition of the vehicle 10 can be characterized by the relative roll angle between the vehicle body and the wheel axle and the wheel departure angle (between the wheel axle and the average road surface). Both the relative roll angle and the wheel departure angle may be calculated in relative roll angle estimation module 54 by using the roll rate and lateral acceleration sensor signals. If both the relative roll angle and the wheel departure angles are large enough, the vehicle 10 may be in either single wheel lifting or double wheel lifting. On the other hand, if the magnitude of both angles is small enough, the wheels 12 and 13 are likely all grounded. In case that both of them are not small and the double wheel lifting condition is detected or determined, the sum of those two angles will be used by the feedback control module 56 to compute the desired actuation command for achieving rollover control performance.

The roll condition of the vehicle 10 can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle 10 might have lifted wheels. Small magnitude of this angle indicates the wheels are all grounded.

The roll condition of the vehicle 10 can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition can be further differentiated based on the chassis roll angle computation, i.e., in low mu surface, the chassis roll angle is usually very small. Hence, an accurate determination of chassis roll is desired.

The roll condition of the vehicle 10 can be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. Hence, an accurate determination of chassis roll and pitch angles is desired.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of the vehicle 10 can be characterized by the chassis roll angle itself, i.e., the relative roll angle between the vehicle body and the wheel axle. If this chassis roll angle is increasing rapidly, the vehicle might be on the edge of wheel lifting or rollover. Small magnitude of this angle indicates the wheels 12 and 13 are not lifted or are all grounded. Hence, an accurate determination of the chassis roll angle is beneficial for determining if the vehicle is in non-rollover events.

The roll condition of the vehicle 10 can also be characterized by the roll angle between the wheel axle and the average road surface, this is called wheel departure angle. If the roll angle is increasing rapidly, the vehicle 10 has lifted wheel or wheels and aggressive control action needs to be taken in order to prevent the vehicle 10 from rolling over. Small magnitude of this angle indicates the wheels are not lifted.

Safety device 51 may control the position of the front right wheel actuator 55A, the front left wheel actuator 55B, the rear left wheel actuator 55C, and the right rear wheel actuator 55D. Although as described above, two or more of the actuators may be simultaneously controlled. For example, in a rack-and-pinion system, the two wheels coupled thereto are simultaneously controlled. Based on the inputs from sensors 20 and 35-47, controller 26 determines a roll condition and/or wheel lift and controls the steering position, braking of the wheels, and /or suspension characteristics, such as wheel lift and dampening.

Safety device 51 may be coupled to a brake controller 60. Brake controller 60 controls the amount of brake torque at a front right brake 62a, front left brake 62b, rear left brake 62c and a rear right brake 62d ($FR_B$, $FL_B$, $RR_B$, $RL_B$). Other safety systems such as an antilock brake system 64, a yaw stability control system 66 and a traction control system 68 may also benefit from the knowledge of the roll gradient, roll rate parameter, roll acceleration coefficient, additional mass and position of the mass. This information may impact the control strategy such as modifying the brake force.

Figure 3:
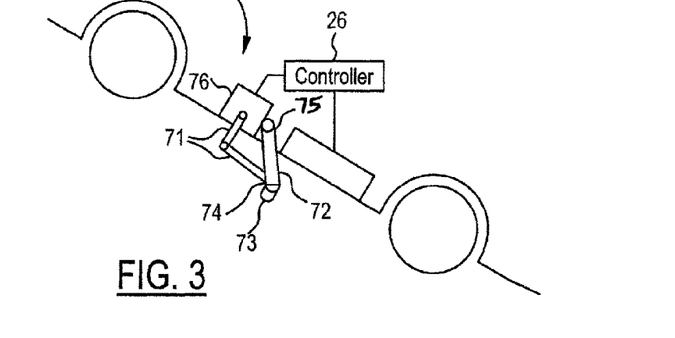
FIG. 3 is a rear side perspective view of a vehicle incorporating a lateral support system in accordance with an embodiment of the present invention.

Referring now also to FIG. 3, a rear side perspective view of a vehicle 10' incorporating an example lateral support system 70 in accordance with an embodiment of the present invention is shown. The lateral support system 70 is part of the control system 11 and can include an active tensegrity device or a deployable set of linkages 71 and arm 72, which has a wheel set 73 attached to the outwardly extending end 74 thereof. The inward end 75 of the arm 72 is attached to a deploying mechanism 76. The arm 72 may be mechanically released, such that the deploying mechanism 76 includes a spring (not shown), which is released when desired. The position of the arm 72 may be systematically, electrically, mechanically, hydraulically, and/or pneumatically actuated and controlled. The arm 72 may also be coupled to a damper (not shown) to absorb forces applied thereon. The arm 72 is deployed from various sides of the vehicle including the top, side, bottom, front, rear, etc.

The lateral support system 70 may also or alternatively include laterally deployable airbags (not shown). The airbags are also outwardly deployed to prevent a rollover. The airbags may be deployed from any location on the vehicle 10' and any number of which may be utilized.

Referring now to FIG. 2, the control system 11 further includes inwardly mounted wheel assemblies 80. The inwardly mounted wheel assemblies 80 include wheel sets 81, which may be passive or active. When active wheel sets are utilized, wheel set actuators 82 are incorporated to deploy or adjust the position of the wheel sets. In one embodiment, the actuators 82 are used to adjust the vertical position of the wheel sets. The operation, location, and positioning of the wheel sets is described in further detail below, with respect to FIGS. 10-12.

The wheel sets 81 are used to unload the loaded driving surface wheel(s) in a large roll angle situation or the like or in some other rollover characterized situation. The wheel sets 81 are also used to allow the vehicle 10 to travel in a different direction than that associated with the direction of the loaded wheel(s). For example, a loaded driving surface wheel may be directed in a first direction and a wheel set associated therewith may unload that driving surface wheel and have a degree-of-freedom, which allows it to travel in a second or lateral direction relative to the first direction.

The wheel sets 81 may be of various types and styles. In one embodiment of the wheel sets 81 are omni-directional wheel sets, which are capable of rolling in multiple directions. Example omni-directional wheel sets are shown and described with respect to FIGS. 12 and 13 below. In another embodiment, the wheel sets 81 are coupled to or incorporated in a caster setup or the like, which allows the wheel sets to freely swivel about a vertical axis. A caster wheel setup example is shown in FIG. 15. The driving forces or momentum of the vehicle 10 govern the rolling direction of a caster wheel set.

The inwardly mounted wheel assemblies 80 may also include wheel set sensors 83, which may be used to detect the lateral or diagonal traveling speeds of a vehicle 10. When one of the wheel sets 81 is in contact with a driving surface the stated speeds may be determined.

The control system 11 also includes an indicator 90, which may be used to indicate to a vehicle operator various vehicle related and status information. The indicator 90 may include a video system, an audio system, a heads-up display, a flat-panel display, a telematic system, a dashboard indicator, a panel indicator, or other indicator known in the art. In one embodiment of the present invention, the indicator 90 is in the form of a heads-up display and the indication signal is a virtual image projected to appear forward of the vehicle 10. The indicator 90 provides a real-time image of the target area to increase the visibility of the objects during relatively low visible light level conditions without having to refocus ones eyes to monitor an indication device within the vehicle 10.

Figure 4:
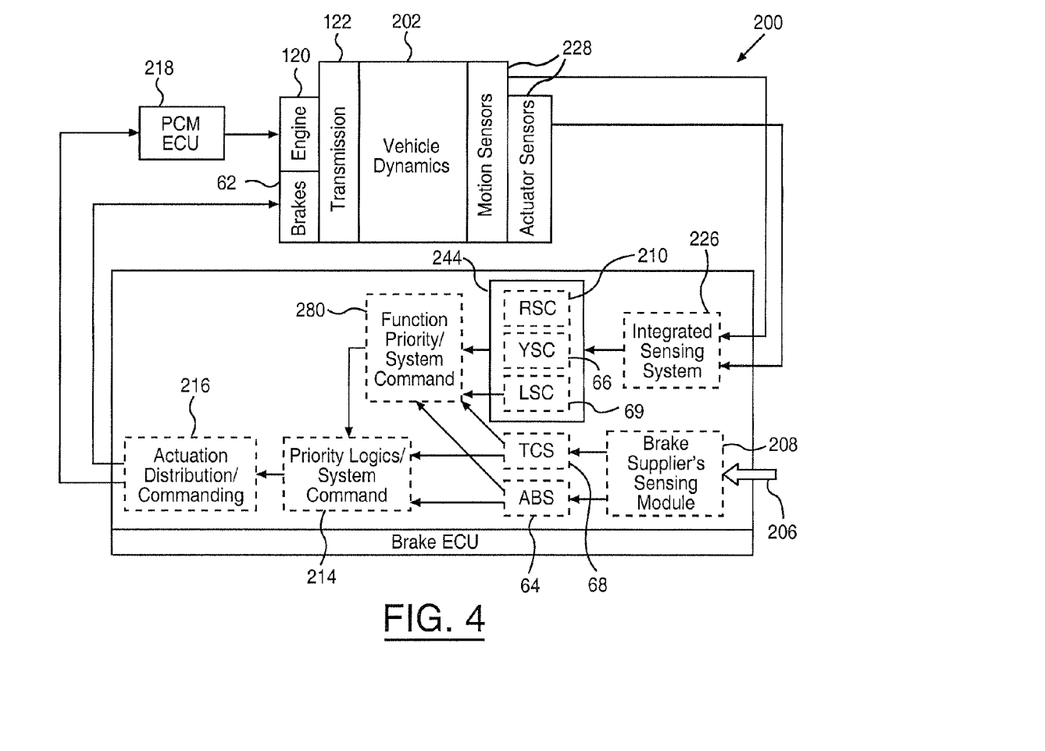
FIG. 4 is a block diagrammatic view illustrating interrelationships among various units within a control system for controlled vehicle dynamics in accordance with an embodiment of the present invention.

Referring now to FIG. 4, a block diagrammatic view illustrating interrelationships among various units within a control system 200 for controlled vehicle dynamics in accordance with an embodiment of the present invention is shown. The vehicle dynamics is represented by the module 202. The vehicle dynamics 202 includes the angular and translation movements of a vehicle. The motion and actuation sensors 228 generate signals corresponding to the vehicle dynamics and the actions of the various actuators. The sensors are fed into the ISS unit 226. The sensor signals and the calculated signals from a system other than from the ISS unit 226 (for example, the brake supplier's own brake control computations), represented by arrow 206, may be fed into the sensing module 208. The ISS unit 226 is coupled to the ISCS unit 244 and may specifically be coupled to the RSC function module 210 and the YSC function module 66. A function priority system command 280 may also be included. The output of the TCS module 68 and the ABS module 64 may be coupled to priority logic system command 214, which in turn is coupled to the actuation distribution and commanding block 216. The actuation distribution commanding block 216 is coupled to the powertrain control ECU 218 and to the brakes 62. The powertrain control module 218 may be coupled to the engine 120 and transmission 122. The actuation of the engine, the brakes and the transmission may affect the vehicle dynamics 202, which in turn is sensed by the various sensors. Thus, as can be seen, a continuous loop of sensing and controlling with respect to the vehicle dynamics is illustrated.

Figure 5:
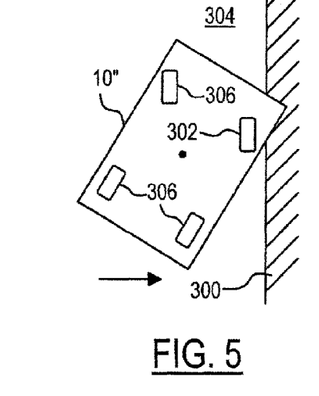
FIG. 5 is a overhead view of a vehicle approaching an imminent tripping obstacle.
Figure 6:
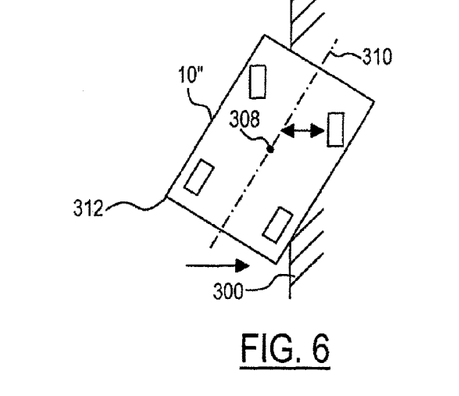
FIG. 6 is a overhead view of a vehicle upon avoidance of an imminent tripping obstacle and in accordance with an embodiment of the present invention.
Figure 7:
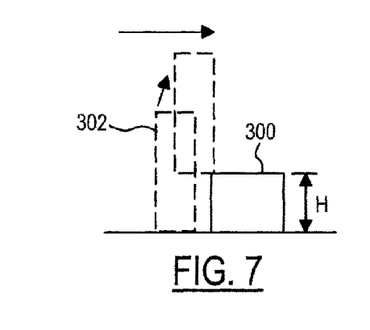
FIG. 7 is a rear view of a driving surface wheel of a vehicle illustrating a wheel lifting procedure in accordance with an embodiment of the present invention.

Referring now to FIG. 5-7, overhead views of a vehicle 10″ having a control system, such as the control system 11, which is used to prevent a tripped rollover and a rear view of the vehicle 10″ illustrating a wheel lifting procedure in accordance with an embodiment of the present invention are shown. Upon approaching and detecting an imminent tripping obstacle, such as a curb or elevated driving surface 300 as shown, the nearest approaching or trip impending driving surface wheel 302 is lifted to or above the height H of the obstacle. This prevents a collision between the trip impending wheel 302 and the obstacle, thereby, delaying and potentially preventing a tripping event. FIG. 5 illustrates the vehicle approaching the obstacle and FIG. 6 illustrates the position of the vehicle 10″ as it rides over the obstacle. In FIG. 6, the vehicle 10″ is partially over both the original driving surface 304 and the elevated driving surface 300. In avoiding a collision with the object, the three following driving surface wheels 306 remain in contact with and thus maintain traction and grip on the original driving surface 300. Note also that should a tripping event occur the pivot point associated therewith is shifted towards the center 308 or centerline 310 of the vehicle 10″, as well as the lagging edge 312 of the vehicle 10″. This significantly increases the forces needed to cause a tripped rollover. Arrows represent the traveling direction of the vehicle 10″. Similar arrows are also shown in FIGS. 9-12.

Figure 8:
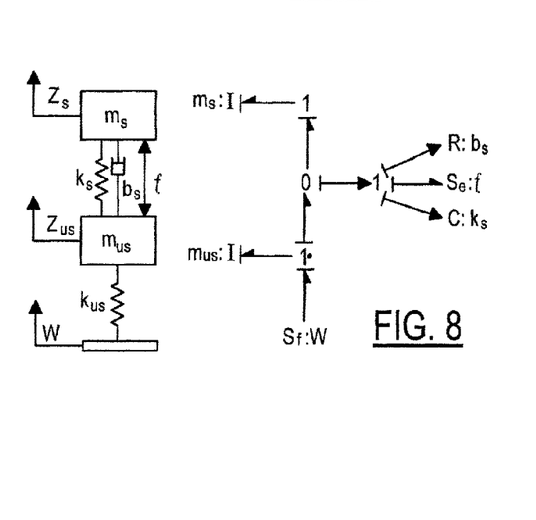
FIG. 8 is a mechanical quarter vehicle system model in accordance with an embodiment of the present invention.

Referring now to FIG. 8, a mechanical quarter vehicle system model is shown. In order to raise a driving surface wheel at the appropriate time and to the appropriate level, the suspension actuators associated therewith are designed to exert certain power and force levels. Actuators currently exist that are capable of exerting such power and force levels and the specific design of such is therefore not described herein. However, the following model and height determinations are provided for a better understanding of how such power, forces, and height raising or vertical displacement levels are obtainable and may be determined.

A two degree of freedom quarter car model equipped with an adjustable force element is shown. Assuming that the springs and damping associated with the model are linear and the tire damping is negligible, an active suspension system can be represented mathematically as shown in the following equation:

$$\dot{x} = Ax + Bf + B_w w \dot{w} \qquad (1)$$

where $x = [x_1, x_2, x_3, x_4]$, $x_1$ is the tire deflection, $x_2$ is the unsprung mass velocity, $x_3$ is the suspension displacement, and $x_4$ is the sprung mass velocity. The matrices A, B, and $B_w$ are represented below, respectively, are shown by the following expressions:

$$A = \begin{bmatrix} 0 & 1 & 0 & 0 \\ -\omega_{us}^2 & -2\zeta\rho\omega_s & \rho\omega_s^2 & 2\zeta\rho\omega_s \\ 0 & -1 & 0 & 1 \\ 0 & 2\zeta\omega_s & -\omega_s^2 & -2\zeta\omega_s \end{bmatrix} \qquad (2)$$

$$B = \begin{bmatrix} 0 \\ \rho \\ 0 \\ -1 \end{bmatrix} \qquad (3)$$

$$B_w = \begin{bmatrix} -1 \\ 0 \\ 0 \\ 0 \end{bmatrix} \qquad (4)$$

The variables $\omega_s$, $\omega_{us}$, $\zeta$, and $\rho$ represent the sprung mass frequency, the unsprung mass frequency, the damping ratio of the sprung mass frequency, and $\rho$ ratio between sprung mass and unsprung mass. The variables $\omega_s$, $\omega_{us}$, $\zeta$, and $\rho$ are provided by the following equations:

$$\omega_s = \sqrt{k_s/m_s} \qquad (5)$$

$$\omega_{us} = \sqrt{k_s/m_s} \qquad (6)$$

$$\zeta = b_s/(2m_s\omega_s) \qquad (7)$$

$$\rho = m_s/m_{us} \qquad (8)$$

where $m_s$ is the sprung mass, $m_{us}$ is the unsprung mass, $k_s$ is the suspension spring constant, $k_{us}$ is the tire spring constant, $b_s$ is the suspension damping coefficient, $z_s$ is the sprung mass displacement, $z_{us}$ is the unsprung mass displacement, $\tilde{f}=f/m_s$ is the normalized adjustable force, and w is the road disturbance displacement, as shown in FIG. 1.

Wheel-Lift Height to Clear Imminent Tripping Obstacle

Upon the detection of an imminent tripping obstacle, the active suspension lifts the tire/wheel to clear or ride over the obstacle. In the following the amount of actuator power, actuator force, and resulted suspension travel during the process of clearing an obstacle is analyzed based on the quarter car model.

To clear an obstacle, such as a curb, the driving surface tire of concern is lifted off the ground (for the amount of static tire deflection) in addition to the curb height, as shown by:

$$x_{UM} \geq (x_{curb} + x_{tire}) \qquad (9)$$

$x_{UM}$ is the unsprung mass movement, $x_{curb}$ is the curb height, and $x_{tire}$ is the static tire deflection.

Since a suspension actuator is located in the suspension between the sprung and unsprung mass, the unsprung mass movement $x_{UM}$ is related to the actuator movement $X_A$ (or suspension travel) as shown by:

$$x_A = \frac{m_{SM} + m_{UM}}{m_{SM}} x_{UM} \qquad (10)$$

The actuator movement to clear the curb height $x_{curb}$ is provided as:

$$x_A \geq \frac{m_{SM} + m_{UM}}{m_{SM}} (x_{curb} + x_{tire}) \qquad (11)$$

The force exerted by the actuator $F_A$ is provided as:

$$F_A = K_s x_A + b_s \dot{x}_A + m_{UM} \ddot{x}_{UM} \qquad (12)$$

Wheel-Lift Height for Loaded Wheel to Clear Obstacle

While a vehicle may maintain its overall attitude and center of gravity height with the lifting of one loaded or driving surface wheel (such as on a vehicle having four driving surface wheels), there is a possibility where the vehicle center of gravity height is lowered by gravity due to the clearance of ground support on that driving surface wheel before the potential tripping event. This may hold true when the trip impending wheel is one of two loaded wheels. As such, the vehicle is supported on the loaded side of the vehicle by only one other wheel (i.e., the non-trip impending wheel on the loaded side). The height in which the trip impending wheel or tire thereof is raised $x_{UM}$ is shown by the following equation:

$$x_{UM} \geq x_{curb} + x_{tire} + x_{SMdrop} = x_{curb} + x_{tire} + \frac{1}{2} \cdot \text{percent\_load} \cdot g \cdot \Delta T^2 \qquad (13)$$

where $x_{SMdrop}$ is the amount of car body/sprung mass drop due to the active lifting of one wheel, percent_load is the percentage of load the lifted wheel corner of the vehicle bears before the lifting action, g is gravity, and $\Delta T$ is the duration of time associated with the lifting action. As such, a low to medium power/force levels are sufficient to provide the desired raising of a loaded driving surface wheel during a rollover or tripped rollover event.

Figure 9:
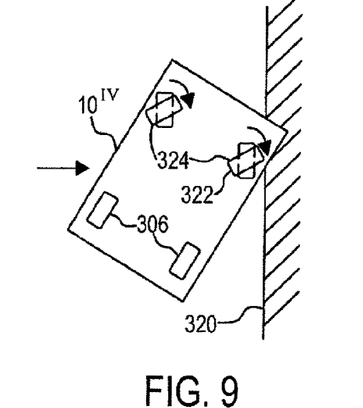
FIG. 9 is an overhead view of a vehicle illustrating active steering as a result of an imminent tripping obstacle in accordance with an embodiment of the present invention.

Referring now to FIG. 9, an overhead view of a vehicle $10^{IV}$ illustrating active steering as a result of an imminent tripping obstacle in accordance with an embodiment of the present invention is shown. During an imminent tripping event, the vehicle $10_{IV}$ upon detecting an imminent tripping obstacle 320 and upon determining that there is a high potential of a rollover directs at least the trip impending wheel 322 towards the detected obstacle. In so doing, the vehicle $10^{IV}$ tends to drive over as opposed to colliding into the obstacle 320. The trip impending wheel 322 may be steered independent of the other driving surface wheels. In the embodiment shown, the front wheels 324 are linked together and thus are both directed towards the obstacle 320.

Figure 10:
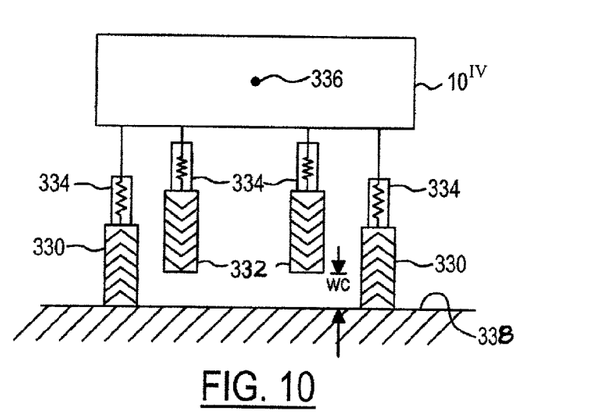
FIG. 10 is a rear view of a portion of a vehicle illustrating a passive suspension wheel arrangement in a stable operating mode in accordance with an embodiment of the present invention.
Figure 11:
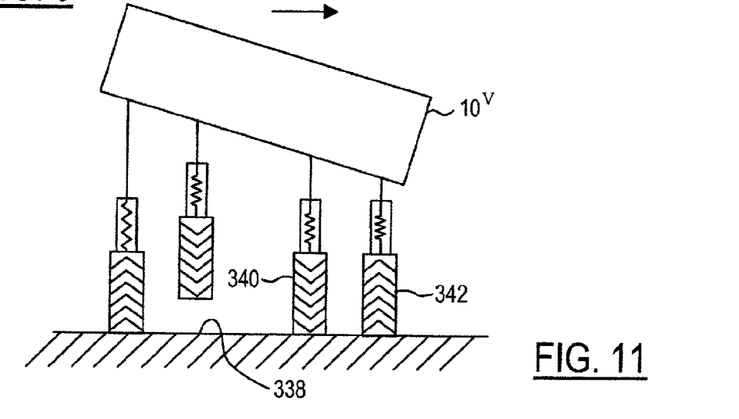
FIG. 11 is a rear view of the vehicle of FIG. 9 illustrating a large roll angle in accordance with an embodiment of the present invention.

Referring now to FIGS. 10 and 11, rear views of a portion of a vehicle $10^V$ illustrating a passive suspension wheel arrangement in a stable operating mode and in a large roll angle situation are shown in accordance with an embodiment of the present invention. Two outer driving surface wheels 330 are shown with corresponding inwardly mounted wheel sets 332. Each driving surface wheel 330 and each wheel set 332 may have an associated spring/damper 334. The wheel sets 332 or corresponding assemblies are mounted on the vehicle $10^V$ closer to the longitudinal centerline 336 than the driving surface wheels 330.

The wheel sets 332 are mounted in a normally raised position relative to the driving surface wheels 330. In normal driving conditions the wheels sets 332 are not in contact with the driving surface 338. However, when the vehicle $10^V$ is experiencing a large roll angle, as shown in FIG. 11, the wheel set 340 near the loaded driving surface wheel 342 comes in contact with and decreases the load on the driving surface wheel 342. The wheel sets 332 thus have a predetermined driving surface clearance WC when the vehicle $10^V$ is in a normal operating state. Regardless of whether the trip impending wheel 342 is raised during a tripped rollover event, the omni-directional nature or multi-directional nature of the wheel set 340 allows the vehicle $10^V$ to ride over the imminent tripping obstacle.

Figure 12:
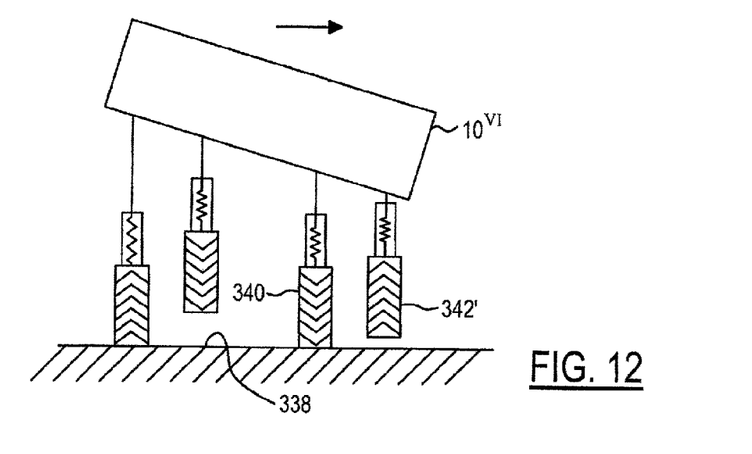
FIG. 12 is a rear view of a portion of a vehicle illustrating an active suspension wheel arrangement during a large roll angle condition in accordance with another embodiment of the present invention.

Referring now to FIG. 12, a rear view of a portion of a vehicle $10^{VI}$ illustrating an active suspension wheel arrangement during a large roll angle condition in accordance with another embodiment of the present invention is shown. During an imminent tripping rollover event or large roll angle condition, in addition to the wheel set 340 corresponding to the trip impending wheel 342' coming in contact with the driving surface 338, the trip impending wheel 342' is raised. This provides increased distance between and thus delays any potential collision with the imminent tripping obstacle. The traveling speed of the vehicle $10^{IV}$ can be decreased during this delay, which can mitigate and/or prevent a rollover.

Figure 13:
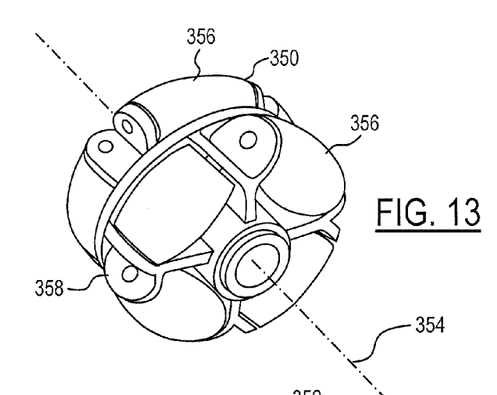
FIG. 13 is an example of an omni-directional wheel set.
Figures 14, 15:
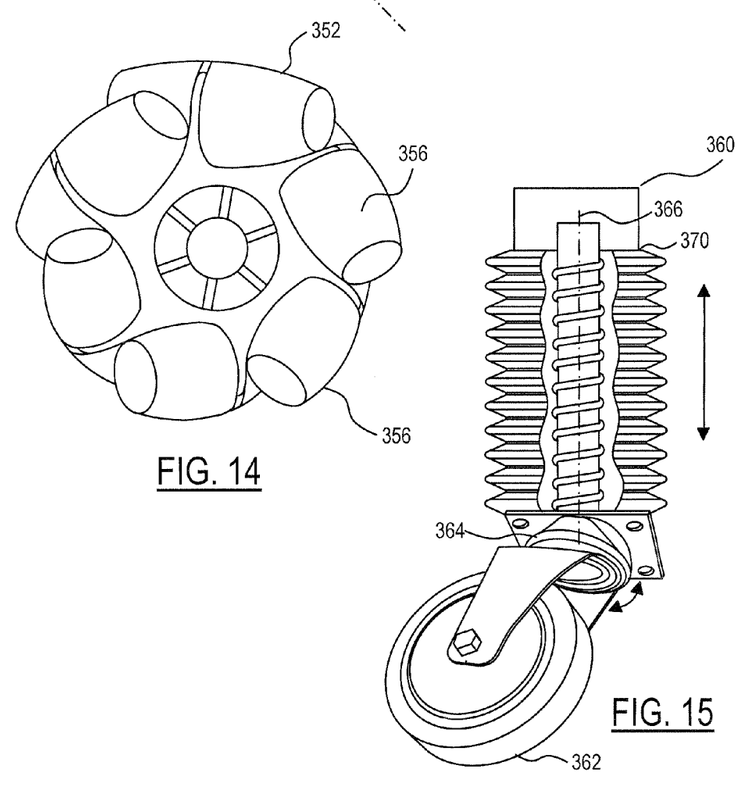
FIG. 14 is another example of an omni-directional wheel set.
FIG. 15 is a perspective side view of a caster wheel setup in accordance with another embodiment of the present invention.

Referring now to FIGS. 13 and 14, example omni-directional wheel sets 350 and 352 are shown. Various omni-directional wheel sets exist, only a couple of which are shown. The omni-directional wheel sets 350 and 352, in general, have an overall wheel or toroidal shape, a main rolling axis 354 upon which the wheel sets 350 and 352 roll thereon, and multiple lateral or diagonal rolling wheels 356. The lateral or diagonal rolling wheels 356 have individually associated rolling axes 358 (one of which is called out) and may individually roll in a direction of the main rolling axis 354. When the lateral or diagonal rolling wheels 356 are configured to roll in a lateral direction, the individual rolling axes 358 are in an approximately perpendicular relationship with the main rolling axis 354, as shown by the wheel set of FIG. 13.

The wheel sets 350 and 352 may also have associated actuators, such as the actuators 82 described above, which may be used when parking the vehicle. The wheel sets 350 and 352 and actuators may be used to facilitate in the rotating of a vehicle when moving at slow speeds or when at a standstill. This increases the ease in parallel parking. With the use of the wheel sets 350 and 352 and actuators, a vehicle may be laterally maneuvered into a parking space having a length slightly larger than or approximately equal to the length of that vehicle.

Referring now to FIGS. 2 and 15, FIG. 15 provides a perspective side view of a caster wheel setup or assembly 360 in accordance with another embodiment of the present invention. The caster wheel assembly 360 is provided as one example of a wheel assembly that may be used in the above-described embodiments. The caster wheel assembly 360 includes a wheel 362, which may be a uni-directional wheel or an omni-directional wheel that is supported by a caster bearing set 364. The bearing set 364 allows the wheel 362 to freely pivot about a vertical axis 366. The wheel 362 may be coupled to a spring/damper/actuator assembly 370, which is used to control the vertical position thereof.

Figure 16:
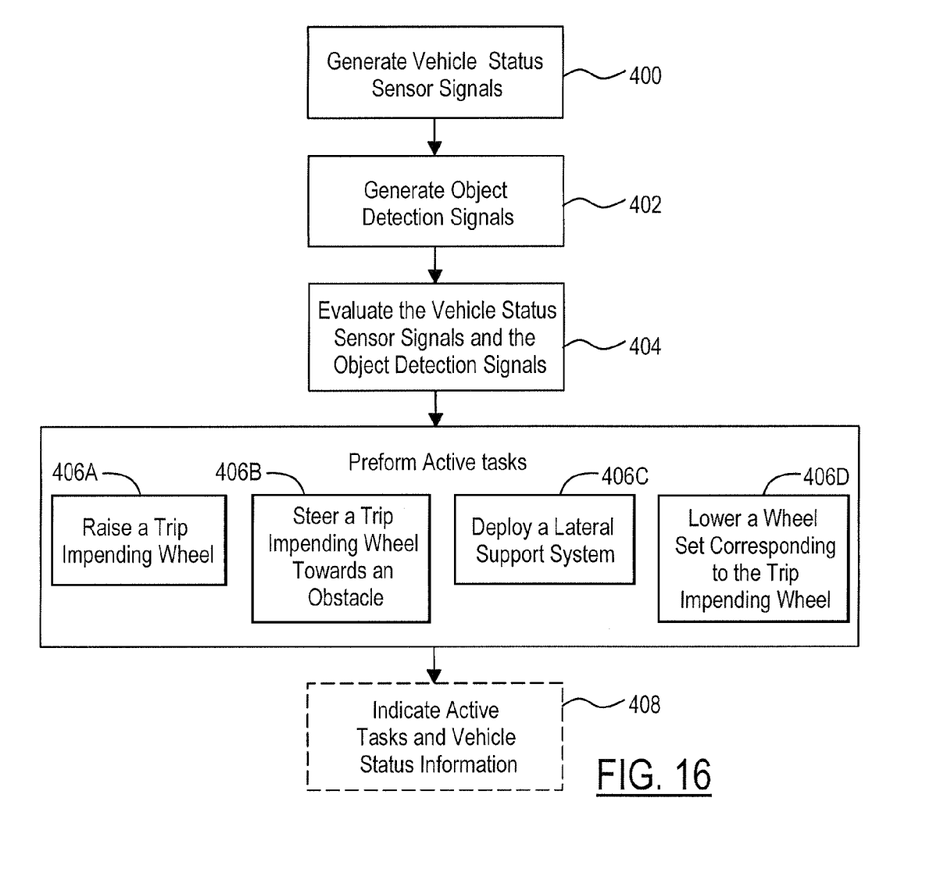
FIG. 16 is a logic flow diagram illustrating a method of operating a control system or a stability control system of a vehicle in accordance with multiple embodiments of the present invention.

Referring now to FIG. 16, a logic flow diagram illustrating a method of operating a control system or a stability control system of a vehicle in accordance with multiple embodiments of the present invention is shown. Although the following steps are described primarily with respect to the embodiments of FIGS. 1-14, they may be modified and applied to other embodiments of the present invention.

In step 400, vehicle status sensor signals are generated, such as by the vehicle status sensors 20 and 35-47, passive safety system sensors 28 and 29, active safety system sensors, which may share sensors 20, 28, 29, and 35-47, and the like or in response thereto. To name a few, a longitudinal acceleration signal, a longitudinal acceleration gradient signal, a lateral acceleration signal, a lateral acceleration gradient signal, a yaw rate signal, a yaw gradient signal, and a collision status signal are generated.

In step 402, object detection signals are generated, such as from the object detection sensors 28.

In step 404, vehicle status sensor signals and the object detection signals are evaluated. In response to the evaluation a detected object may be determined to be an imminent tripping obstacle and a vehicle rollover notification signal may be generated.

In step 406, active tasks may be performed to prevent a vehicle rollover and/or a tripping event. Active braking, steering, and suspension control may be exhibited.

In step 406A, when an imminent tripping obstacle is detected one or more trip impending wheels may be raised in response to the rollover notification signal to prevent the wheels from colliding with the obstacle. The trip impending wheel is raised to a level and at a speed that overcomes the body rolling motion of the vehicle.

In step 406B, when an imminent tripping obstacle is detected the trip impending wheel may be steered toward the obstacle in response to the rollover notification signal. The trip impending wheel may be steered after it is determined that there is a high probability that the traveling direction of the vehicle cannot be altered to prevent colliding with the imminent tripping obstacle.

In step 406C, when a rollover situation is detected and/or an imminent tripping obstacle is detected the lateral support system may be deployed externally and outwardly from the vehicle.

In step 406D, when an imminent tripping obstacle is detected a wheel set, such as one of the omni-directional wheels sets, may be lowered in response to the vehicle rollover notification signal. In one embodiment, the trip impending wheel is also raised in response to the vehicle rollover notification signal. A first vertical position of the wheel set and a second vertical position of the trip impending wheel are controlled.

Note that steps 406A-D may be performed separately, in any combination, sequentially, simultaneously, or in combination with other tasks to mitigate and/or prevent a rollover.

Also, when a wheel set is in contact with a driving surface, wheel set sensor signals may be generated, which may be used in determining the status of the vehicle. Such signal generation and evaluation may be incorporated in the above-mentioned steps.

Actuator systems other than active braking systems, such as EPAS, active front steering (AFS), active limited slip-differential (e-Diff), and other known actuator systems, can also be activated to mitigate large yaw rates and large roll angles experienced. Integrated actuation of multiple actuators using multiple-stage control algorithms may be used.

In step 408, the control system may indicate via an indicator, such as the indicator 90, to a vehicle operator that active tasks are being performed and the status of the vehicle. This indicated information may also be stored, viewed, and downloaded for future review and/or evaluation. The viewing and downloading may be to an offboard or offsite system.

The above tasks may be performed via any one or more of the herein mentioned controllers, control systems, stability control systems, or the like.

The above-described steps are meant to be illustrative examples; the steps may be performed sequentially, synchronously, simultaneously, iteratively, or in a different order depending upon the application and situation.

While particular embodiments of the invention have been shown and described, numerous variations and alternate embodiments will occur to those skilled in the art. Accordingly, it is intended that the invention be limited only in terms of the appended claims.

What is claimed is:

1. A rollover stability control system for a vehicle comprising:
at least one object information device detecting an obstacle before the obstacle contacts the vehicle;
an active suspension coupled to at least one wheel of the vehicle; and
a controller coupled to the at least one object information device and the active suspension, the controller receiving one or more sensor signals indicative of a status of the vehicle and operating in a normal stability control system operating mode or a tripped rollover operating mode,
wherein, when operating in the tripped rollover operating mode, the controller is configured to generate or receive a first rollover notification signal in response to the one or more sensor signals, identify an imminent tripping obstacle, and raise the at least one wheel to prevent the at least one wheel from contacting the obstacle in response to the first rollover notification signal and imminent tripping obstacle identification, and
wherein the controller operates in the tripped rollover operating mode when the vehicle is experiencing one or more of a specified roll angle and specified lateral slip angle as indicated by the one or more sensor signals, wherein the tripped rollover operating mode is triggered by the controller in response to the first rollover notification signal, the first rollover notification signal generated or received in response to the imminent tripping obstacle identification.

2. A system as in claim 1 wherein the at least one wheel is raised prior to the at least one wheel contacting the obstacle.

3. A system as in claim 1 wherein the at least one wheel is raised to a level above the obstacle.

4. A system as in claim 1 wherein the at least one object information device comprises at least one of an object indicator, a sensor, a global positioning system, a navigation system, a camera, a laser sensor, an infrared sensor, or a radio frequency sensor.

5. A system as in claim 1 further comprising at least one vehicle status sensor generating a vehicle status signal, the controller raising the at least one wheel in response to the vehicle status signal.

6. A system as in claim 1 further comprising a lateral support system, the controller deploying the lateral support system externally and outwardly from the vehicle in response to the first rollover notification signal and the determination.

7. A system as in claim 6 wherein the lateral support system is deployed subsequent to raising the at least one wheel.

8. A system as in claim 6 wherein the controller deploys the lateral support system subsequent to raising the at least one wheel and in response to a second rollover notification signal.

9. A rollover stability control system for a vehicle comprising:

at least one object information device detecting an obstacle before the obstacle contacts the vehicle;

an active steering system coupled to at least one wheel of the vehicle; and a controller coupled to the at least one object information device and the active steering system, the controller receiving one or more signals indicative of a status of the vehicle and operating in a normal stability control system operating mode or a tripped rollover operating mode, wherein, when operating in the tripped rollover operating mode, the controller is configured to generate or receive a first rollover notification signal indicating identification of an imminent tripping obstacle in response to the one or more sensor signals, and steer the at least one wheel toward the obstacle in response to the first rollover notification signal, wherein the at least one wheel is steered toward the obstacle when the first rollover notification signal is received while the vehicle is experiencing one or more of a specified roll angle and specified lateral slip angle as indicated by one or more of the sensor inputs.

10. A rollover stability control system as in claim 9 wherein the controller steers a plurality of wheels toward the obstacle in response to the first rollover notification signal and imminent tripping obstacle identification.

11. A system as in claim 9 further comprising a lateral support system, the controller deploying the lateral support system externally and outwardly from the vehicle in response to the first rollover notification signal and the determination.

12. A system as in claim 11 wherein the lateral support system is deployed subsequent to the steering of the at least one wheel.

13. A system as in claim 11 wherein the controller deploys the lateral support system subsequent to the steering of the at least one wheel and in response to a second rollover notification signal.

14. A rollover stability control system for a vehicle comprising:

at least one object information device detecting an obstacle before the obstacle contacts the vehicle;

a lateral support system; and a controller coupled to the at least one object information device and the lateral support system, the controller receiving one or more signals indicative of a status of the vehicle and operating in a normal stability control system operating mode or a tripped rollover operating mode, wherein, when operating in the tripped rollover operating mode, the controller is configured to generate a rollover notification signal indicating identification of an imminent tripping obstacle in response to the one or more sensor signals, and deploy the lateral support system externally and outwardly from the vehicle in response to the rollover notification signal, wherein the lateral support system is deployed when the first rollover notification signal is received while the vehicle is experiencing one or more of a specified roll angle and specified lateral slip angle as indicated by the one or more sensor signals.

15. A rollover stability control system as in claim 14 wherein the lateral support system comprises at least one retractable arm.

16. A rollover stability control system as in claim 14 wherein the lateral support system comprises:

at least one arm; and at least one wheel set coupled to the at least one arm.

17. A rollover stability control system as in claim 14 wherein the lateral support system is deployed from a side of the vehicle.

18. A rollover stability control system as in claim 14 wherein the lateral support system is deployed from the undercarriage of the vehicle.

19. A rollover stability control system as in claim 14 wherein the lateral support system is passively released when deployed.

20. A rollover stability control system as in claim 14 wherein the lateral support system comprises:

at least one actuator; and at least one deployable element coupled to the at least one actuator.

21. A rollover stability control system as in claim 14 wherein the lateral support system comprises an active tensegrity device.

22. A method of operating a rollover stability control system for a vehicle having at least four wheels, each wheel including an outer sidewall, the method comprising:

detecting an object that may cause the vehicle to experience a tripped rollover and generating a vehicle rollover notification signal based on sensor inputs; and raising, in response to the vehicle rollover notification signal, at least one wheel of the vehicle when the vehicle is moving laterally toward the object such that none of the outer sidewalls of the wheel will strike the object, wherein the at least one wheel of the vehicle is raised when the rollover notification signal is received while the vehicle is experiencing one or more of a specified roll angle and specified lateral slip angle as indicated by one or more of the sensor inputs.

23. A method as in claim 22 comprising:

deploying a lateral support system externally and outwardly from the vehicle in response to the rollover notification signal.

* * * * *